(12) United States Patent
Kim

(10) Patent No.: US 9,162,683 B2
(45) Date of Patent: Oct. 20, 2015

(54) METHOD AND SYSTEM FOR STARTING ENGINE DURING FAILURE OF STARTER MOTOR OF HYBRID ELECTRIC VEHICLE

(71) Applicant: Hyundai Motor Company, Seoul (KR)

(72) Inventor: Sang Joon Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/098,164

(22) Filed: Dec. 5, 2013

(65) Prior Publication Data

US 2014/0379184 A1   Dec. 25, 2014

(30) Foreign Application Priority Data

Jun. 19, 2013  (KR) .................. 10-2013-0070450

(51) Int. Cl.
*B60W 50/029* (2012.01)
*F02N 11/00* (2006.01)
*B60W 10/08* (2006.01)
*B60W 20/00* (2006.01)
*F02N 11/10* (2006.01)
*F02N 15/02* (2006.01)
(Continued)

(52) U.S. Cl.
CPC .............. *B60W 50/029* (2013.01); *B60K 6/48* (2013.01); *B60W 10/02* (2013.01); *B60W 10/06* (2013.01); *B60W 10/08* (2013.01); *B60W 20/40* (2013.01); *B60W 20/50* (2013.01); *F02N 11/006* (2013.01); *F02N 11/108* (2013.01); *F02N 15/022* (2013.01); *B60W 2510/0275* (2013.01); *B60W 2710/083* (2013.01); *F02N 2300/104* (2013.01); *Y10S 903/93* (2013.01)

(58) Field of Classification Search
CPC ..... B60W 20/00; B60W 10/08; B60W 10/06; Y02T 10/6286; B60K 6/445
USPC .......................................................... 701/409
See application file for complete search history.

(56) References Cited

U.S. PATENT DOCUMENTS 3,101,012 A * 8/1963 Livezey et al. ................ 475/119
5,620,392 A * 4/1997 Genise .......................... 477/120
(Continued)

FOREIGN PATENT DOCUMENTS

JP       2006-170120 A       6/2006
KR         100831435 B1      5/2008
KR       10-2009-0098318 A   9/2009

OTHER PUBLICATIONS

Machine translation of JP,2013-049307,A dated Nov. 5, 2014(http://www4.ipdl.inpit.go.jp/Tokujitu/tjsogodbenk.ipdl).*

*Primary Examiner* — John R Olszewski
*Assistant Examiner* — Jean-Paul Cass
(74) *Attorney, Agent, or Firm* — McDermott Will & Emery LLP

(57) ABSTRACT

A method of starting an engine when a starter motor of a hybrid electric vehicle has a failure includes identifying a request for starting the engine in a state where the starter motor has the failure. When the request for starting the engine is made in the state where the starter motor has the failure, a torque or a load of an engine clutch and a pressure of the engine clutch are determined. A torque of a driving motor is set to a smaller torque between a driving motor demanded torque and a torque obtained by subtracting the torque of the engine clutch from a maximum torque of the driving motor. The engine starts with the set torque of the driving motor while controlling the engine clutch.

4 Claims, 6 Drawing Sheets

(51) Int. Cl.
    *B60K 6/48*    (2007.10)
    *B60W 10/02*   (2006.01)
    *B60W 10/06*   (2006.01)

(56) References Cited

U.S. PATENT DOCUMENTS

| | | | |
|---|---|---|---|
| 7,206,682 B2 * | 4/2007 | Bodin et al. | 701/67 |
| 7,472,769 B2 * | 1/2009 | Yamanaka et al. | 180/65.25 |
| 7,565,238 B2 * | 7/2009 | Nakagawa et al. | 701/113 |
| 7,784,575 B2 * | 8/2010 | Yamanaka et al. | 180/65.275 |
| 8,046,154 B2 * | 10/2011 | Yoon | 701/105 |
| 2006/0106520 A1 * | 5/2006 | Bodin et al. | 701/67 |
| 2007/0102205 A1 * | 5/2007 | Yamanaka et al. | 180/65.1 |
| 2007/0102207 A1 * | 5/2007 | Yamanaka et al. | 180/65.3 |
| 2008/0228383 A1 * | 9/2008 | Nakagawa et al. | 701/113 |
| 2009/0157281 A1 * | 6/2009 | Yoon | 701/105 |
| 2014/0172253 A1 * | 6/2014 | Palmer et al. | 701/56 |
| 2015/0041277 A1 * | 2/2015 | Boyes et al. | 192/80 |

* cited by examiner

METHOD AND SYSTEM FOR STARTING ENGINE DURING FAILURE OF STARTER MOTOR OF HYBRID ELECTRIC VEHICLE

CROSS-REFERENCE TO RELATED APPLICATION

This application claims the benefit of priority to Korean Patent Application No. 10-2013-0070450 filed in the Korean Intellectual Property Office on Jun. 19, 2013, the entire contents of which are incorporated herein by reference.

TECHNICAL FIELD

The present disclosure relates to a method and a system for starting an engine when a starter motor of a hybrid electric vehicle has a failure.

BACKGROUND

As is well known, hybrid electric vehicles use an internal combustion engine and a battery together as a power supply. That is, the hybrid electric vehicles efficiently combine power of the internal combustion engine and power of a driving motor.

As illustrated in FIG. 1, a hybrid electric vehicle may include, for example, an engine 10, a driving motor 20, an engine clutch 30 for splitting power between the engine 10 and the driving motor 20, a transmission 40, a differential gear 50, a battery 60, an integrated starter-generator 70 for starting the engine 10 or generating electricity by rotational force of the engine 10, and vehicle wheels 80.

Here, although the integrated starter-generator 70 serves as both the starter motor and the electric generator, the above described integrated starter-generator is related with the starting of the engine, so that the integrated starter-generator 70 is considered as the starter motor.

The hybrid electric vehicle may further include a hybrid controller (HC) 200 for controlling the entire operation of the hybrid electric vehicle, an engine control unit (ECU) 110 for controlling an operation of the engine 10, a motor controller (MC) 120 for controlling an operation of the driving motor 20, a transmission control unit (TCU) 140 for controlling an operation of the transmission 40, and a battery controller (BC) 160 for controlling and managing the battery 60.

The battery controller 160 may be called a battery management system (BMS). The integrated starter-generator 70 may be called an integrated starter & generator (ISG) or a hybrid starter & generator (HSG).

The hybrid electric vehicle may drive in an electric vehicle (EV) mode, which is a true electric vehicle mode only using power of the driving motor 20, a hybrid electric vehicle (HEV) mode, which uses rotational force of the engine 10 as a main power and rotational force of the driving motor 20 as an auxiliary power, and a regenerative braking (RB) mode for collecting braking and inertial energy during driving by braking or inertia of the vehicle through electric generation of the driving motor 20 to charge the battery 60.

The hybrid electric vehicle may start the engine 10 by using the driving motor 20 providing driving force when the starter motor has a failure. For example, in the related art, when the starter motor has the failure, the engine may start by connecting the engine clutch or with the driving force of the driving motor while connecting the engine clutch.

However, according to the related art, the connection of the engine clutch or a difference in torque between the engine and the driving motor generates shock when a fuel injection starts without starting the engine, thus deteriorating driving performance.

That is, according to the related art, in a case where the vehicle is not in a rapid acceleration situation as illustrated in FIG. 2, the shock is rarely generated during the connection of the engine clutch. However, when the vehicle accelerates rapidly such that the driving motor outputs the maximum torque as illustrated in FIG. 3, load compensation for a slip joint of the engine clutch is necessary, thus decreasing acceleration torque and deteriorating acceleration linearity.

In the related art illustrated in FIG. 3, an inclination change of three steps including step 1 which is before the engine clutch for starting the engine is connected, step 2 in which the engine clutch is being connected, and step 3 which is after the engine clutch is connected, is generated, thus deteriorating acceleration linearity.

That is, as described in FIG. 3, the load compensation of the engine clutch is impossible when pressure of the engine clutch is applied, thus generating an abrupt vehicle stop sensation.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a method and a system for starting an engine when a starter motor of a hybrid electric vehicle has a failure, to prevent acceleration disconnection sensation generated during the engine start by using a driving motor in a situation such as rapid acceleration, by predicting and/or considering a load (or torque) of an engine clutch. That is, a torque value of the driving motor is set to a value obtained by subtracting a load of the engine clutch from the maximum torque of the driving motor when the engine starts by using the driving motor in the case in which the failure of the starter motor of the hybrid electric vehicle is identified.

An exemplary embodiment of the present disclosure provides a method for starting an engine when a starter motor of a hybrid electric vehicle has a failure. The method includes identifying a request for starting the engine in a state where the starter motor has the failure. When the request for starting the engine is identified in the state where the starter motor has the failure, a torque or a load of an engine clutch and a pressure of the engine clutch are determined. A torque of a driving motor is set to a smaller torque between a driving motor demanding torque and a torque obtained by subtracting the torque of the engine clutch from a maximum torque of the driving motor. The engine starts with the set torque of the driving motor while controlling the engine clutch.

A load torque of the engine clutch $T_{clutch}$ may be calculated by equations (1) and (2) below ($J_{eng}$: engine rotational inertia, $w_{eng\_tgt}$: engine target speed, $T_{eng\_friction}$: engine friction torque).

$$J_{eng} \cdot \dot{w}_{eng\_tgt} = -T_{clutch} - T_{eng\_friction} \quad \text{(Equation 1)}$$

$$T_{clutch} = -T_{eng\_friction} - J_{eng} \cdot \dot{w}_{eng\_tgt} \quad \text{(Equation 2)}$$

The engine rotational inertia may be a pre-recognized value, the engine target speed may be a predetermined value, and the engine friction torque may be obtained through a predetermined test.

A pressure F applied to the engine clutch may be calculated by Equation (3) below.

$$T_{clutch}=\text{Friction coefficient}\times\text{Effective radius}\times\text{The number of friction surfaces}\times\text{Sign} \quad \text{(Equation 3)}$$

The friction coefficient, the effective radius, and the number of friction surfaces may be values determined according to a design specification of the engine clutch, the sign may be positive (+) when delta RPM is equal to or greater than 0, and the sign may be negative (−) when delta RPM is smaller than 0.

A torque command value of the driving motor may be obtained by adding the torque of the engine clutch to the torque of the driving motor.

Another exemplary embodiment of the present disclosure provides a system of starting an engine when a starter motor of a hybrid electric vehicle has a failure. The system includes an engine and a driving motor to provide power to the hybrid electric vehicle, and a starter motor to start the engine. An engine clutch is disposed between the engine and the driving motor and splits the power. A controller is configured to start the engine with the driving motor when the starter motor has the failure and control the engine clutch when the engine starts by the driving motor. The controller operates by a program set for performing the method for starting the engine when the starter motor of the hybrid vehicle according to an exemplary embodiment of the present disclosure has the failure.

As described above, according to an exemplary embodiments of the present disclosure, it is possible to prevent acceleration disconnection sensation generated during the starting of the engine by using a driving motor in a situation such as rapid acceleration, by predicting and/or considering a load (or torque) of an engine clutch. That is, a torque value of the driving motor is set by subtracting a load of the engine clutch from the maximum torque of the driving motor, when the engine starts by using the driving motor in the case in which the starter motor of the hybrid electric vehicle has the failure.

DETAILED DESCRIPTION OF THE EMBODIMENTS

Figure 1:
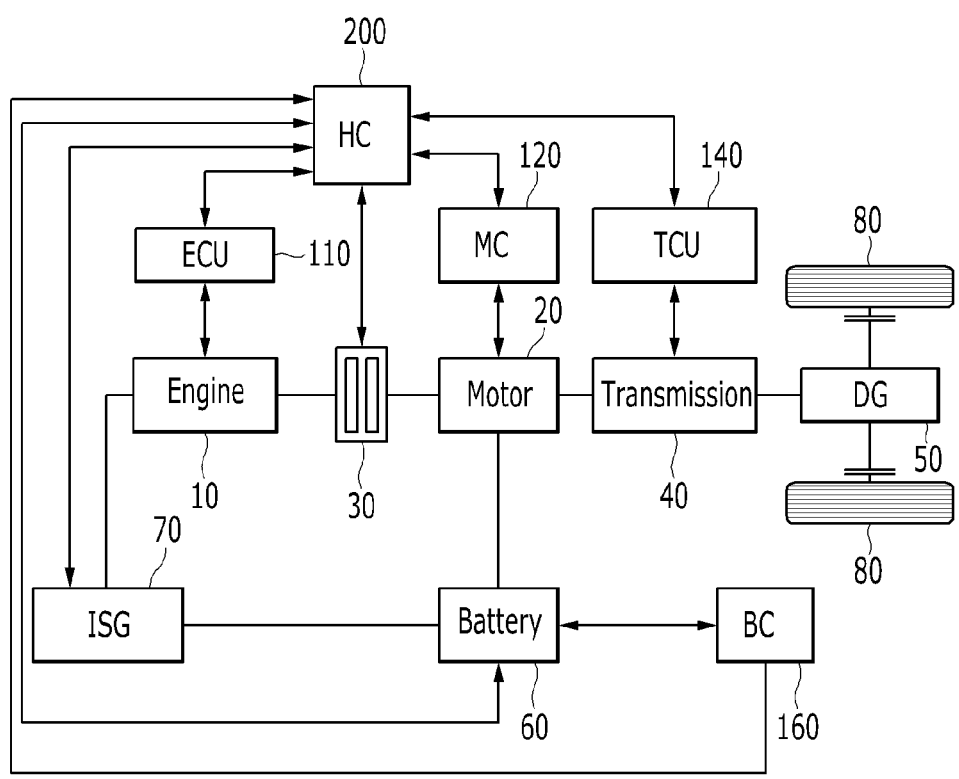
FIG. 1 is a schematic block diagram of a general hybrid electric vehicle.
Figure 2:
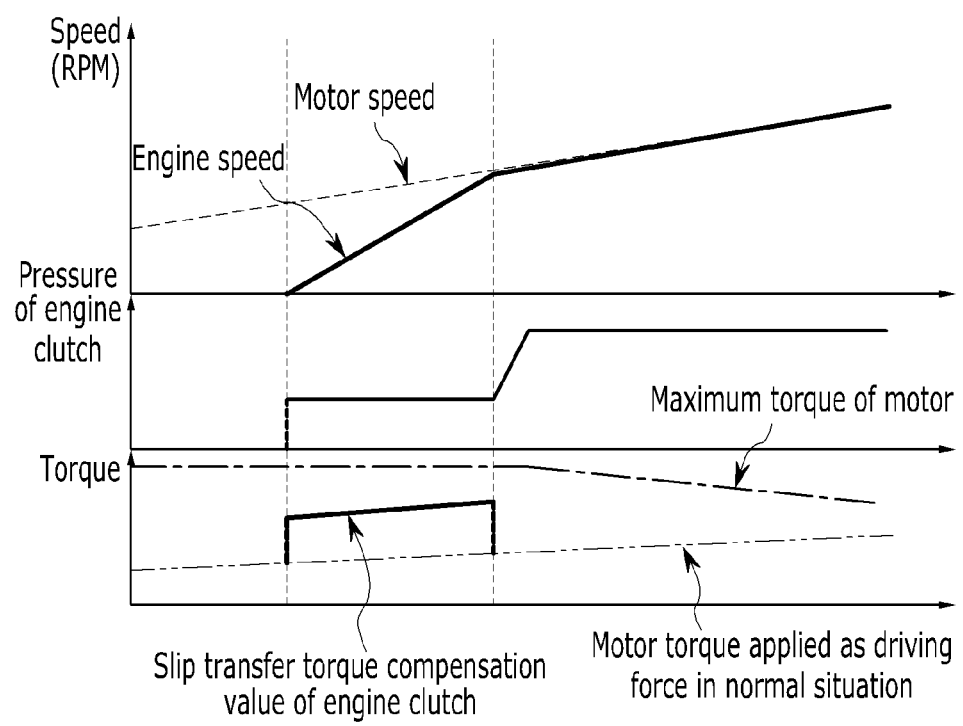
FIGS. 2 and 3 are graphs for describing a method of starting an engine when a starter motor of a hybrid electric vehicle according to the related art has a failure.

Hereinafter, the present disclosure will be described more fully with reference to the accompanying drawings, in which exemplary embodiments of the present disclosure are shown. As those skilled in the art would realize, the described embodiments may be modified in various different ways, all without departing from the spirit or scope of the present disclosure.

Same reference numerals designate the same elements throughout the specification.

FIG. 1 is a diagram schematically illustrating a hybrid electric vehicle to which a system for starting an engine when a starter motor has a failure according to an exemplary embodiment of the present disclosure is applied.

As illustrated in FIG. 1, the hybrid electric vehicle according to an exemplary embodiment of the present disclosure, may include an engine 10, a motor 20, an engine clutch 30 for splitting power between the engine 10 and the motor 20, a transmission 40, a differential gear 50, a battery 60, and an integrated starter-generator 70 for starting the engine 10 or generating electricity by output of the engine 10.

The integrated starter-generator 70 serves as both the starter motor and an electric generator, but in the present disclosure, the integrated starter-generator is related with the starting of the engine when the starter motor has a failure, so that the integrated starter-generator 70 is considered as the starter motor in the description below.

Further, the hybrid electric vehicle, to which the system for starting the engine according to an exemplary embodiment of the present disclosure is applied, may include a hybrid controller (HC) 200 for controlling the entire operation of the hybrid electric vehicle including operations of the starter motor 70 and the engine clutch 30, an engine control unit (ECU) 110 for controlling an operation of the engine 10, a motor controller (MC) 120 for controlling an operation of the motor 20, a transmission control unit (TCU) 140 for controlling an operation of the transmission 40, and a battery controller (BC) 160 for controlling and managing the battery 60.

Figure 4:
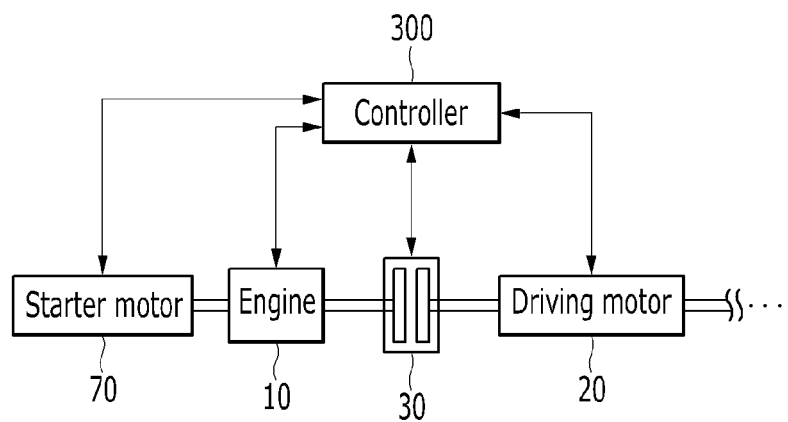
FIG. 4 is a configuration diagram of a system for starting an engine when a starter motor of a hybrid electric vehicle has a failure according to an exemplary embodiment of the present disclosure.

FIG. 4 is a block diagram illustrating the system for starting the engine according to an exemplary embodiment of the present disclosure.

The system for starting the engine according to an exemplary embodiment of the present disclosure uses the driving motor to starting the engine when the starter motor has a failure.

The system for starting the engine according to an exemplary embodiment of the present disclosure may include the starter motor 70 for starting the engine 10, the engine clutch 30 for splitting the power between the engine 10 and the driving motor 20, and a controller 300 for starting the engine 10 with the driving motor 20 while controlling the engine clutch 30 when the starter motor 70 has a failure.

A hybrid electric vehicle has the engine 10, the drive motor 20, the engine clutch 30, and the starter motor 70 are installed in general, so that more detailed description thereof will be omitted.

The controller 300 may be implemented with one or more microprocessors operated by a predetermined program or a hardware including the microprocessor. The predetermined program includes a series of commands for performing a method of starting the engine according to an exemplary embodiment of the present disclosure.

In an exemplary embodiment of the present disclosure, the controller 300 may be a hybrid controller (HC) or may be included in the HC.

Referring back to FIG. 1, in an exemplary embodiment of the present disclosure, the controller 300 may include an engine control unit (ECU) for controlling the engine 10 of the hybrid electric vehicle, a motor controller (MC) for controlling the driving motor 20, and a hybrid controller (HC) for controlling the entire operation of the hybrid electric vehicle including operations of the engine clutch 30 and the starter motor 70.

Some processes in the method of starting the engine according to an exemplary embodiment of the present disclosure to be described below may be performed by the engine control unit (ECU), some other processes may be performed by the motor controller (MC), and some other processes may be performed by the hybrid controller (HC).

However, it should not be understood that the scope of the present disclosure is limited to the description of the exemplary embodiment to be described below. The controller may be implemented with a combination which is different from that of the description in the exemplary embodiment of the present disclosure. Alternatively, the ECU, the MC, and the HC may perform as a combination of processes different from that of the description of the exemplary embodiment.

Hereinafter, the method of starting the engine of the hybrid electric vehicle according to an exemplary embodiment of the present disclosure will be described in detail with reference to the accompanying drawings.

Figure 5:
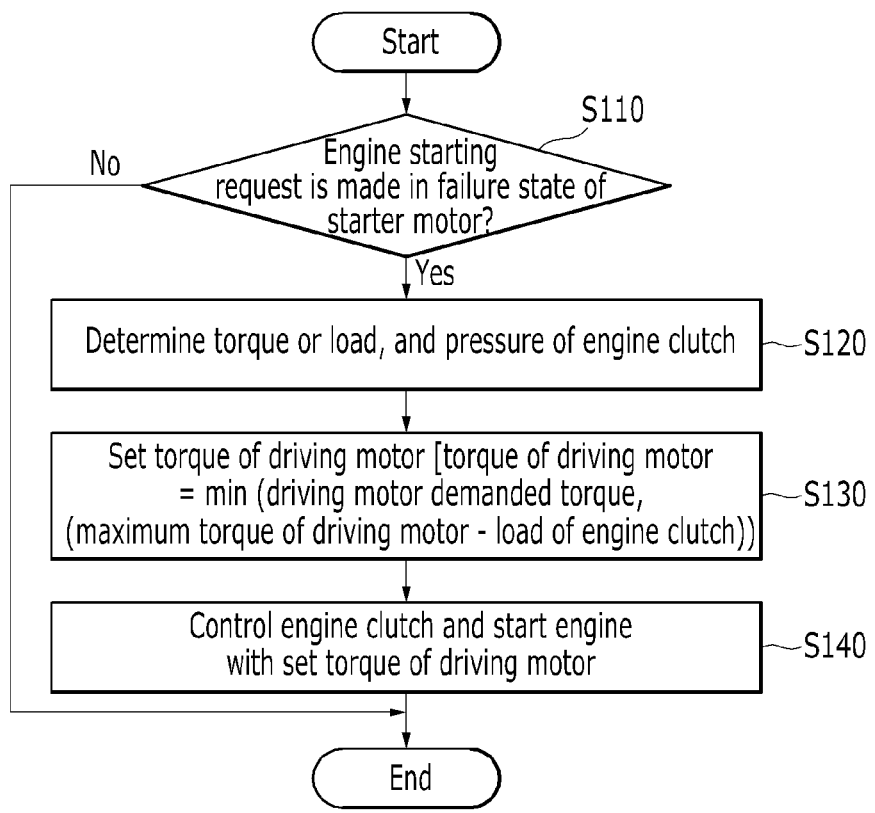
FIG. 5 is a flowchart of a method of starting an engine when a starter motor of a hybrid electric vehicle has a failure according to an exemplary embodiment of the present disclosure.

FIG. 5 is a flowchart of a method of starting an engine when a starter motor of a hybrid electric vehicle according to an exemplary embodiment of the present disclosure has a failure.

As illustrated in FIG. 5, the controller 300 identifies whether starting the engine 10 is requested in a state where the starter motor 70 has the failure (S110).

The controller 300 may identify the failure state of the starter motor 70 according to an existing method of identifying the failure of the starter motor. For example, the controller 300 may identify the failure of the starter motor 70 by referring to a signal of the hybrid controller 200 related to the starter motor 70.

It is apparent to those skilled in the art that starting the engine 10 may be requested, for example, when an electric vehicle (EV) mode needs to be switched to a hybrid electric vehicle (HEV) mode. The controller 300 may refer to the signal of the hybrid controller 200 illustrated in FIG. 1 in order to determine the request for starting the engine 10.

Figure 6:
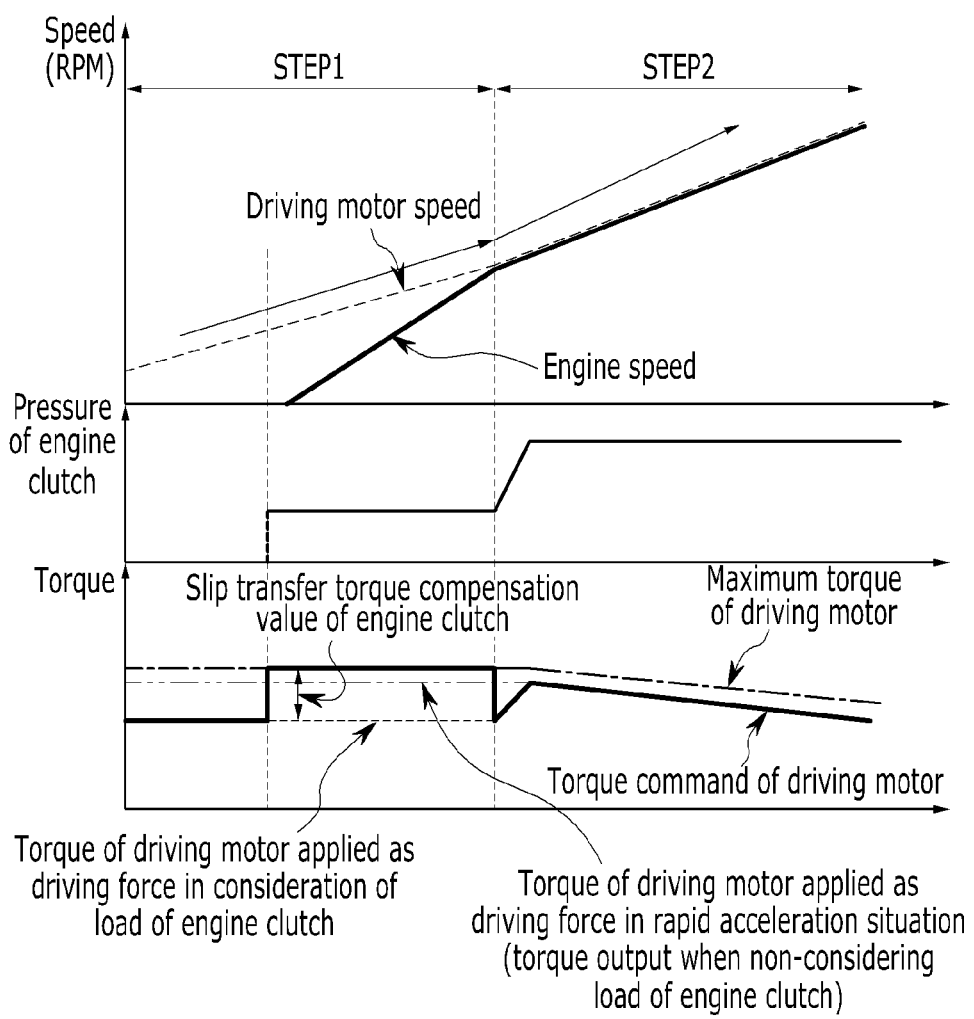
FIG. 6 is a graph for describing an effect of a method of starting an engine when the starter motor of the hybrid electric vehicle has a failure according to an exemplary embodiment of the present disclosure.

In an exemplary embodiment of the present disclosure, for example, as illustrated in FIG. 6, the engine 10 starts for switching the EV mode to the HEV mode in a situation where the driving motor 20 is rapidly accelerated in the EV mode.

When the request for starting the engine 10 is identified in the state where the starter motor 70 has the failure in step S110, the controller 300 determines a torque (or load) of the engine clutch 30 and a pressure of the engine clutch 30 (S120).

The controller 300 may calculate the torque ($T_{clutch}$) of the engine clutch 30 by Equations (1) and (2) below. The torque ($T_{clutch}$) of the engine clutch 30 may be from a friction during slipping of the engine clutch 30, and may be transmitted from an input to an output of the engine clutch 30 during locking-up.

In the equations below, $J_{eng}$ (kg·m²) is engine rotational inertia, $w_{eng\_tgt}$ is an engine target speed for engine control, and $T_{eng\_friction}$ is an engine friction torque, which is a mechanical friction torque present in the engine 10.

$$J_{eng} \cdot \dot{w}_{eng\_tgt} = -T_{clutch} - T_{eng\_friction} \quad \text{Equation (1)}$$

$$T_{clutch} = -T_{eng\_friction} - J_{eng} \cdot \dot{w}_{eng\_tgt} \quad \text{Equation (2)}$$

In an exemplary embodiment of the present disclosure, the engine rotational inertia is pre-recognized, the engine target speed is predetermined, and the engine friction torque is obtained through a predetermined test, so that the controller 300 may calculate the torque or the load of the engine clutch 30 through Equations (1) and (2) above.

The pressure (F) of the engine clutch 30 determined in step S120 may be calculated by Equation (3).

$$T_{clutch} = \text{Friction coefficient} \times \text{Effective radius} \times \text{The number of friction surfaces} \times \text{Sign} \quad \text{(Equation 3)}$$

The friction coefficient, the effective radius, and the number of friction surfaces are values determined according to a design specification of the engine clutch 30. The sign may be positive (+) when delta RPM is equal to or greater than 0, and the sign may be negative (−) when delta RPM is smaller than 0, so that the controller 300 may calculate the pressure of the engine clutch 30 through Equation (3).

When the torque and the pressure of the engine clutch 30 are calculated, the controller 300 may set a torque of the driving motor 20 according to an equation below (S130).

Driving motor torque=Min(Driving motor demanded torque,(driving motor maximum torque−$T_{clutch}$))

That is, the controller 300 sets the torque of the driving motor 70 as a smaller torque between the driving motor demanded torque and a torque obtained by subtracting the torque of the engine clutch 30 from the maximum torque of the driving motor 70.

When the torque of the driving motor 20 is set in step S130, the controller 300 starts the engine 10 with the torque of the driving motor 20 set in step S130 as illustrated in a graph of FIG. 6 while controlling the engine clutch 30 based on the torque value or the load value of the engine clutch 30 calculated in step S120 (S140).

When the engine clutch 30 is synchronized in step S140, that is, the engine 10 and the driving motor 20 have the same speed, the controller 300 may control the engine clutch 30 so that the pressure of the engine clutch 30 is at the maximum.

When the controller 300 starts the engine 10 with the torque of the driving motor 20 in step S140, a torque command value of the driving motor 20 may be obtained by adding the torque of the engine clutch to the set torque of the driving motor as represented in an equation below.

Driving motor torque command=Driving motor torque+Engine clutch load($T_{clutch}$)

According to the exemplary embodiments of the present disclosure, when the engine starts with the driving motor with a rapid acceleration, a slip transfer torque compensation value of the engine clutch is maintained by setting the maximum value of the driving motor to [driving motor maximum torque−engine clutch load] considering the engine clutch load as illustrated in FIG. 6, thereby securing acceleration linearity even in the rapid acceleration situation.

Figure 3:
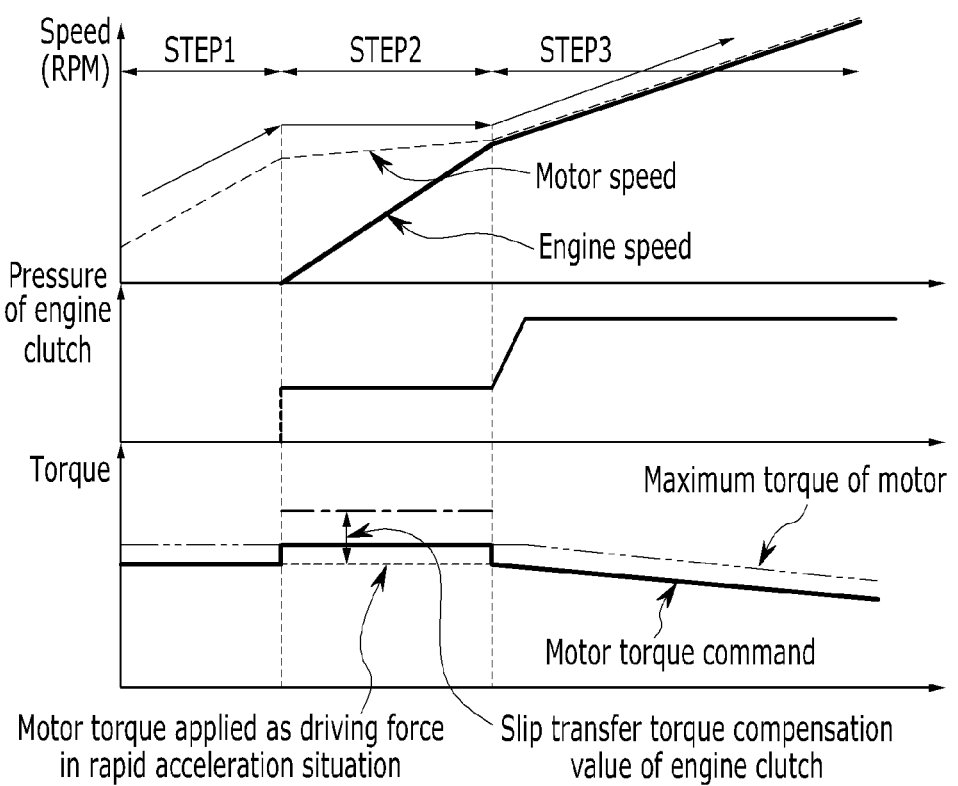

That is, according to the exemplary embodiments of the present disclosure, contrary to an acceleration sense change with three steps in the related art as illustrated in FIG. 3, an acceleration sensation may change with two steps as illustrated in FIG. 6, thereby improving acceleration linearity.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of starting an engine when a starter motor of a hybrid electric vehicle has a failure, the method comprising:
   identifying a request for starting the engine in a state where the starter motor has the failure;
   determining a torque or load of an engine clutch and a pressure of the engine clutch when the request for starting the engine is made in the state where the starter motor has the failure;
   setting a torque of a driving motor to a smaller torque between a driving motor demanding torque and a torque obtained by subtracting the torque of the engine clutch from a maximum torque of the driving motor; and starting the engine with the set torque of the driving motor while controlling the engine clutch, wherein the torque or load of the engine clutch $T_{clutch}$ is calculated by Equations (1) and (2) below, ($J_{eng}$: engine rotational inertia, $w_{eng\_tgt}$: engine target speed, $T_{eng\_friction}$: engine friction torque), $$J_{eng} \cdot \dot{w}_{eng\_tgt} = -T_{clutch} - T_{eng\_friction} \qquad \text{(Equation 1)}$$

$$T_{clutch} = -T_{eng\_friction} - J_{eng} \cdot \dot{w}_{eng\_tgt} \qquad \text{(Equation 2),}$$

and the engine rotational inertia is a pre-recognized value, the engine target speed is a predetermined value, and the engine friction torque is obtained through a predetermined test, and wherein pressure (F) applied to the engine clutch is calculated by Equation (3) below, $$F_{clutch} = \text{Friction coefficient} \times \text{Effective radius} \times \text{The number of friction surfaces} \times \text{Sign} \qquad \text{(Equation 3),}$$

and the friction coefficient, the effective radius, and the number of friction surfaces are values determined according to a design specification of the engine clutch, and the sign is positive (+) when delta RPM is equal to or greater than 0, and the sign is negative (−) when delta RPM is smaller than 0.

2. The method of claim 1, wherein a torque command value of the driving motor is a value obtained by adding the torque of the engine clutch to the torque of the driving motor.

3. A system of starting an engine when a starter motor of a hybrid electric vehicle has a failure, the system comprising:

an engine and a driving motor configured to provide power to the hybrid electric vehicle;

a starter motor configured to start the engine;

an engine clutch disposed between the engine and the driving motor and configured to split the power; and a controller configured to start the engine with the driving motor when the starter motor has the failure, and control the engine clutch when the engine starts by the driving motor, wherein a torque or load of the engine clutch $T_{clutch}$ is calculated by Equations (1) and (2) below, ($J_{eng}$: engine rotational inertia, $w_{eng\_tgt}$: engine target speed, $T_{eng\_friction}$: engine friction torque), $$J_{eng} \cdot \dot{w}_{eng\_tgt} = -T_{clutch} - T_{eng\_friction} \qquad \text{(Equation 1)}$$

$$T_{clutch} = -T_{eng\_friction} - J_{eng} \cdot \dot{w}_{eng\_tgt} \qquad \text{(Equation 2),}$$

and the engine rotational inertia is a pre-recognized value, the engine target speed is a predetermined value, and the engine friction torque is obtained through a predetermined test, and wherein pressure (F) applied to the engine clutch is calculated by Equation (3) below, $$F_{clutch} = \text{Friction coefficient} \times \text{Effective radius} \times \text{The number of friction surfaces} \times \text{Sign} \qquad \text{(Equation 3),}$$

and the friction coefficient, the effective radius, and the number of friction surfaces are values determined according to a design specification of the engine clutch, and the sign is positive (+) when delta RPM is equal to or greater than 0, and the sign is negative (−) when delta RPM is smaller than 0.

4. A non-transitory computer-readable recording medium comprising computer executable instructions of which cause a controller to perform the method according to claim 1.

\* \* \* \* \*